INVENTOR.
CHRISTOPHER A. RAFFERTY
BY Herbert L. Harris
ATTORNEY

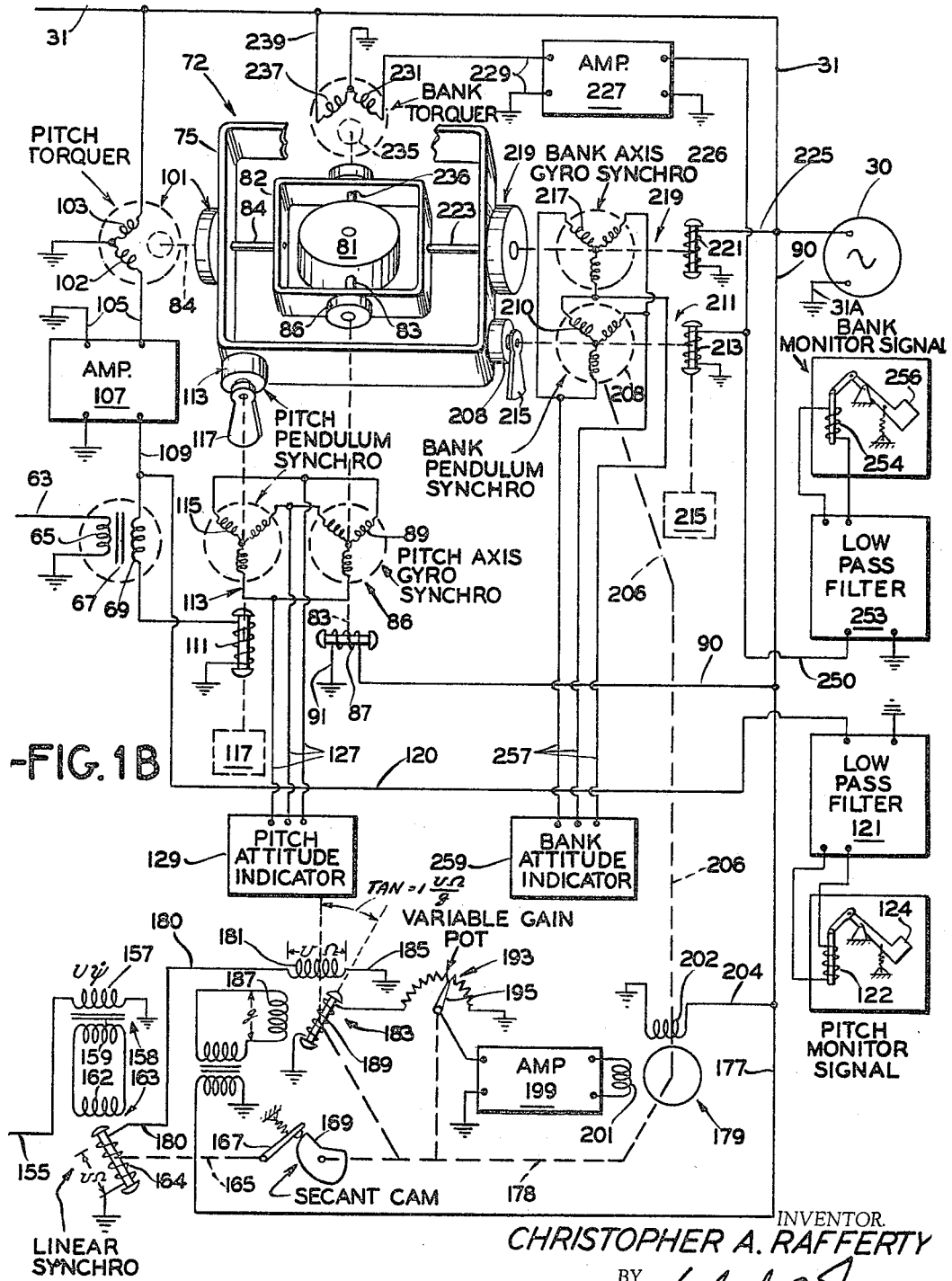

United States Patent Office 3,285,077
Patented Nov. 15, 1966

3,285,077
VERTICAL GYRO ERECTION SYSTEM
Christopher A. Rafferty, Palisade, N.J., assignor to The Bendix Corporation, Teterboro, N.J., a corporation of Delaware
Filed June 24, 1963, Ser. No. 290,049
15 Claims. (Cl. 74—5.41)

This invention relates to improvements in an integrated erection control system for gyro verticals for use in a vehicle such as an aircraft and to improvements in a vertical gyro erection system such as disclosed and claimed in U.S. application Serial No. 240,991, filed November 29, 1962, now Patent No. 3,226,986, by Christopher A. Rafferty, and assigned to The Bendix Corporation, assignee of the present invention, and more particularly the invention relates to an improved erection system for gyro verticals embodying means for deriving true vertical for both pitch and roll attitudes of a craft from air data information and to such a system including means for detecting a malfunction in the vertical erection system.

It has been found that the greatest deficiency in the operation of a gyro vertical probably occurs during long slow turns of an aircraft at high speed, and which deficiencies may be attributable to centrifugal and accelerational forces effecting the operation of the gyro vertical.

It is an object of the invention to provide a vertical gyroscope having a minimum of coercion from the influence of longitudinal acceleration on the erecting mechanism of the gyroscope so as to reduce "porpoising" of the vertical gyroscope.

Heretofore, in the operation of conventional vertical gyroscope systems, there has been experienced generally the following tendencies: It has been found:

(1) That the gyroscope spin axis may be erected to an angle several degrees from a true vertical in pitch due to longitudinal accelerations associated with the aircraft during takeoff and landing approach;

(2) That gyroscope spin axis errors in pitch and bank may occur in the erection of the gyroscope during turning flight maneuvers of an aircraft;

(3) Further, the elimination of gyro erection as a function of an erection error adjustable to the turn rate of the aircraft may not be a completely satisfactory solution of the problem, since the gyroscope may tend to drift during erection cutoff, and it has been found difficult to avoid the problem of permanent loss of erection under some extreme set of conditions.

An object of the invention is to provide a novel means for avoiding the foregoing difficulties by providing that pitch and bank erection may be maintained at all times during flight of the aircraft.

Another object of the invention is to provide novel means whereby a signal proportional to rate of change in airspeed of an aircraft carrying the vertical gyroscope may be added to a dynamic vertical error in a pitch signal of the vertical gyroscope so as to effect a pitch erection signal to energize a torquer motor to correct for the error in pitch of the gyroscope.

While it is recognized that ideally the horizontal component of true airspeed rate of change should be used in the aforenoted computation to correct for the error in pitch, an object of the invention is to provide a simplified means to effect such correction of the vertical error in pitch of the gyroscope and avoid extreme complexity in the control mechanism.

Another object of the invention is to provide simplified means for effecting a correction in the vertical error in pitch of the gyroscope through the generation of a true airspeed rate of change signal which is obtained by means of a diaphragm operated air-flow measuring device so arranged as to sense the time rate of change of total pressure.

Another object of the invention is to provide in the aforenoted arrangement novel, means whereby the output of a rate of pressure sensing element is modulated as a function of dynamic pressure and pressure altitude.

Assuming then that the aircraft is flying in a standard atmosphere, a considerable simplification of the control system may be effected and the necessity of effecting a computation of the ambient air temperature and total pressure is obviated. In the aforenoted arrangement, a quite large deviation in temperature from that assumed in the standard atmosphere can exist before an appreciable error in the computation is realized. This situation is true because the correct modulation varies only as the square root of the absolute ambient air temperature (T); thus in the persent invention, as disclosed hereinafter, the capillary leak resistance coefficient and the elastic properties of the various pressure sensing diaphragm bellows may be so arranged as not to vary appreciably because these components may be maintained in a region of the aircraft which is effectively temperature stabilized.

Another object of the invention is to provide a a vertical gyro erection system in which the required modulation of the rate of change of total pressure is accomplished by two low torque potentiometers operated directly by the difference between total pressure ($P_T$) and static pressure ($P_S$), respectively, and in which a buffer amplifier is interposed between the output of the static pressure operated potentiometer and the excitation voltage of the aforenoted pressure rate measuring device so as to reduce the effect of loading on the potentiometer calibrations.

Another object of the invention is to provide a vertical gyro erection system in which a computed pendulum angle voltage $$\frac{dU}{dt} \times \frac{1}{g}$$

and a pitch pendulum output voltage $$\sin \tan^{-1}\frac{dU}{dt} \times \frac{1}{g}$$

are subtracted before insertion through a pitch erection amplifier to a pitch torquer motor to correct for an error differential signal so that the pitch pendulum signal may be compensated for the effects of longitudinal accelerations of the aircraft in flight on the pitch of the pendulum.

Another object of the invention is to provide a vertical gyro erection system in which a gyro bank synchro is operatively associated with a bank pendulum synchro arranged to align itself with a vertical position during a reasonably cordinated turn in level flight of the aircraft and a system in which the angle of the bank pendulum ($\phi_p$) is then nearly equivalent to the formula $\tan^{-1} U\Omega/g$ where $\Omega$ is the rate of change of flight angle (rad. sec.) about the vertical. U is the airspetd of the aircraft and $g$ is the acceleration due to gravity of the aircraft.

Another object of the invention is to provide in a vertical gyroscope erection system a bank error correction computer in which, as in the case of the pitch correction computer, the airplane is assumed to be flying in a standard atmosphere and in which there is provided means to effect a required modulation of the difference between total and static pressures and effect an addition of such a modulated signal to the roll erection pendulum synchro signal to effect an adequate correction to the erection system.

Another object of the invention is to provide novel means to effect the required modulation of the difference between the total and static pressures by two low torque potentiometers operated directly by the difference between total and static pressures (approximately dynamic pressure $q$) and static pressure ($P_S$), respectively, and in which a buffer amplifier is utilized to reduce the effect of loading on the potentiometer calibrations.

Another object of the invention is to provide in a gyroscope bank error system a computer in which a computation of $\tan^{-1} U\Omega/g$ may be effected by a servo operated resolver, one stator phase winding of which is excited by a voltage proportional to ($g$), the acceleration of the aircraft due to gravity, and the other stator phase winding of which is excited by a voltage proportional to ($U\Omega$) the airspeed of the aircraft times the rate of change of the flight path angle of the aircraft about the vertical (rad./sec.). The rotor winding of the resolver is adjustably positioned by a servomotor in angular relation to the aforenoted two phase windings so as to induce in the rotor winding the computed output signal $\tan^{-1} U\Omega/g$.

Another object of the invention is to provide in a vertical erection system a bank correction system in which a voltage signal ($U\dot\psi$) proportional to airspeed times yaw rate of the aircraft is obtained by exciting a first winding of a yaw rate gyroscope synchro by a voltage proportional to ($U$), the airspeed of the aircraft, and in which another winding of the synchro is adjustably positioned by the rate gyroscope relative to the first winding so that the airspeed signal ($U$) is essentially multiplied by a yaw rate signal ($\dot\psi$) from the yaw rate gyroscope.

Another object of the invention is to provide novel means for obtaining from said product signal a signal proportional to ($U$) airspeed of the aircraft times ($\Omega$) the rate of change of the flight angle of the aircraft about the vertical in which the said product signal from the rate gyroscope synchro is applied to a secant cam operated means to correct the value of the yaw rate signal so as to effect an output signal proportional to ($U\Omega$) airspeed times rate of change of the flight angle about the vertical.

Another object of the invention is to provide a servomotor controlled by the several correction signals heretofore explained and in which the output shaft of the servomotor is the computed bank angle of the vertical gyro so that by rotating the stator windings of the pendulum bank synchro by such computed bank angle ($\phi_a$) the bank correction for the erection system may be automatically accomplished.

Furthermore, since the loop gain of the ($\phi_a$) servomotor is a function of ($\phi_a$) itself because tangent and secant functions are involved, a gain compensation is required in order to obtain a uniform response time, and therefore, a further object of the invention is to provide in such control of the servomotor system a variable gain potentiometer operated by the output shaft of the servomotor to compensate the error signal before being applied through the servo amplifier to the servomotor.

Another object of the invention is to provide a vertical erection computer system for correcting for error in gyroscope pitch and bank which is based fundamentally on the fact that the bank and pitch error signals applied through suitable torquer motors are variably small since gyro drift is the only correction which is required and in which the arrangement is such that the gyro error signals are applied through suitable filters so that, upon the error signals exceeding an arbitrary threshold for a predetermined length of time, there is indicated a failure in the bank and pitch control operation whereupon an alarm occurs to indicate to the operator that either the vertical or bank erection computer of the vertical gyro has failed.

These and other objects and features of the invention are pointed out in the following description in terms of the embodiment thereof which is shown in the accompanying drawings. It is to be understood, however, that the drawings are for the purpose of illustration only and is not a definition of the limits of the invention, reference is to be had to the appended claims for this purpose.

In the drawings, wherein like reference characters refer to like parts throughout the respective views:

FIGURE 1B is a schematic illustration of a second part of the control system including the vertical gyroscope. The complete control system embodying the invention is illustrated by combining the schematic illustration of FIGURE 1A with that of FIGURE 1B.

Figure 1A:
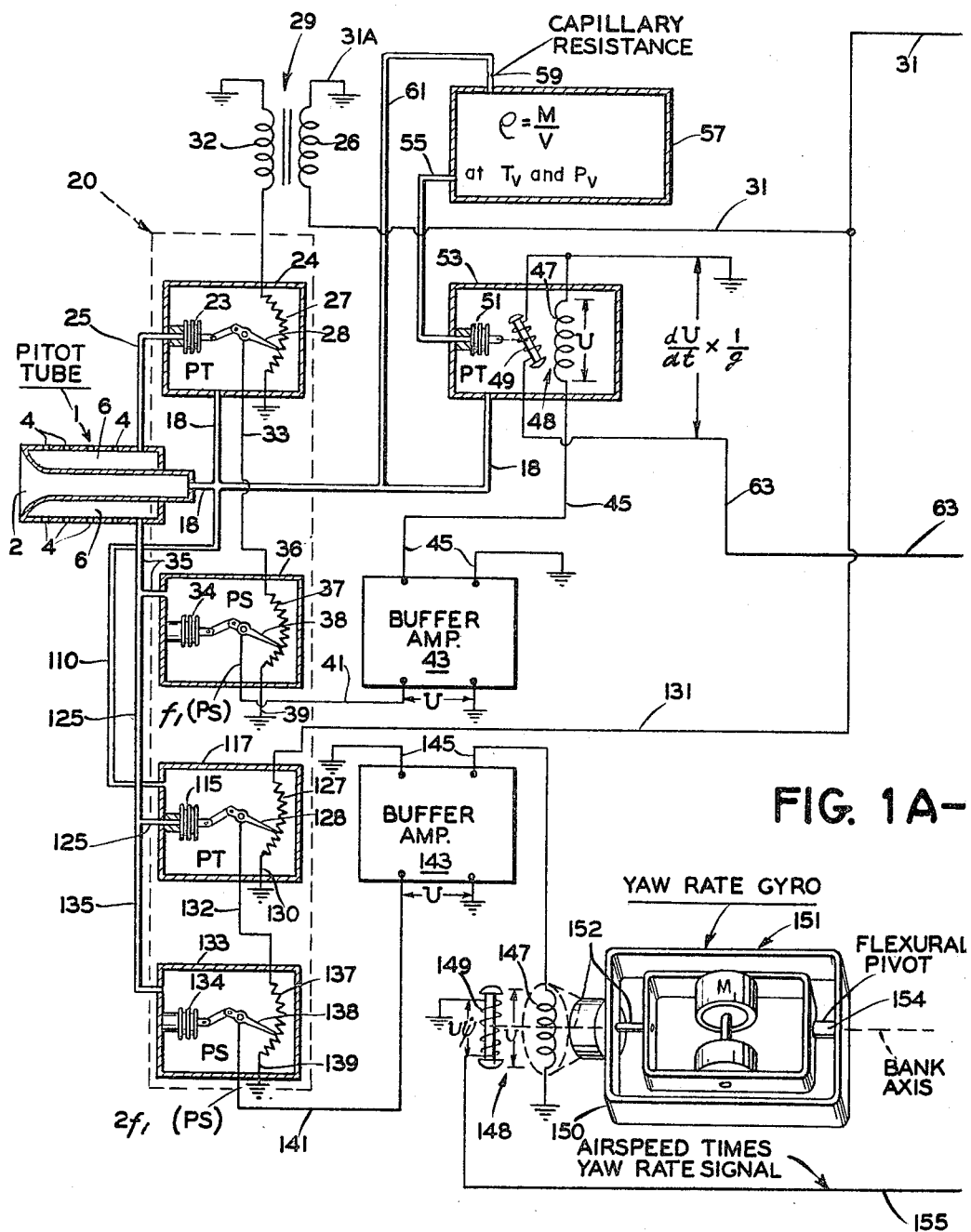
FIGURE 1A is a schematic illustration of a part of the gyro vertical erection control system including the angular rate gyroscope.

Referring to the drawings, there is indicated by the numeral 1, an air pressure probe of conventional type, such as a Pitot tube, which may be in the free airstream and mounted on the airframe of an aircraft so as to sense through the passage 2 impact or total pressure which increases with the speed of the aircraft. The static atmospheric pressure is further sensed through passages 4 in the side of the Pitot tube 1 and leading to a passage 6.

Pitch correction computations

In discussing the development of the underlying principles of the pitch correction computer, reference is hereinafter made to the following pertinent symbols and equations:

$P_s$ = Static air pressure, lbs./ft.$^2$
$P_T$ = Total air pressure, lbs./ft.$^2$
$P_v$ = Pressure of air in chamber, lbs./ft.$^2$
$\Delta P = P_T - P_v$, lbs./ft.$^2$
$q$ = Dynamic pressure ($= \frac{1}{2}\rho U^2$), lbs./ft.$^2$ $= P_T - P_s$ (approx.)
$q_c = P_T - P_s$
$M$ = Mass of air in chamber, lbs.
$\rho$ = Ambient air density, slugs/ft.$^3$
$g$ = Acceleration due to gravity, 32.2 ft./sec.$^2$
$R_T$ = Coefficient of capillary resistance (pressure drop per lb. of air through capillary).
$V$ = Volume of chamber, ft.$^3$
$T_v$ = Temperature (absolute) in chamber, Rankine
$R$ = Universal gas constant, 53.3 for air
$h$ = Altitude (in standard atmosphere), ft.
$t$ = Time. sec.
$U$ = True airspeed, ft./sec.
$T$ = Temperature (absolute) of ambient air, Rankine.

The following relationships are noted:

(1) $$\frac{dM}{dt} = \frac{\Delta P}{R_T}$$

(2) $$P_v V = MRT_v$$

(3) $P_T = P_s + q = P_s + \frac{1}{2}\rho U^2$ approximately

Differentiating Equation 3 with respect to time gives:

(4) $$\frac{dP_T}{dt} = \frac{dP_s}{dt} + \rho U \frac{dU}{dt} = P_s \frac{dh}{dt} + \rho U \frac{dU}{dt}$$

and, since $$\frac{dP_s}{dt} \cong 0 \text{ or } \frac{dh}{dt} \cong 0$$

(for most flight conditions)

(5) $$\frac{dP_T}{dt} = \rho U \frac{dU}{dt}$$

Differentiating Equation 2 with respect to time gives:

(6) $$\frac{dM}{dt} = \frac{Pv}{RT_v}\frac{dV}{dt} + \frac{V}{RT_v}\frac{dP_v}{dt}$$

provided $T_v$ is held constant and, since $$\frac{dV}{dt} = 0$$

Equation 6 can be written (7) $$\frac{dM}{dt} = \frac{V}{RT_v}\frac{dP_v}{dt} = \frac{\Delta P}{R_T}$$

since $\Delta P = P_T - P_V$ (8)
$$\frac{d\Delta P}{ds} = \frac{dP_T}{dt} - \frac{dP_v}{dt}$$

Substituting Equation 5 and 7 into 8 gives:

(9)
$$\frac{d\Delta P}{dt} = \rho U \frac{dU}{dt} - \frac{RT_v}{VR_T}\Delta P$$

If we set $U = U_0 + u$ where $U_0 =$ trim airspeed, $u =$ perturbation airspeed then

(10)
$$U\frac{dU}{dt} \cong U_0 \frac{du}{dt}$$

for sufficiently small $u$.

(10a)
$$\frac{dU}{dt} = \frac{du}{dt}$$

Using the approximation of Equation 10 and taking Laplace transform of both sides of Equation 9 (assuming zero initial conditions) gives:

(11)
$$\frac{\Delta P}{\frac{du}{dt}} = \rho U_0 \tau \frac{1}{\tau s + 1}$$

where:
$s =$ Laplace operator
$$\tau = \frac{R_T V}{T_v R}$$

For static conditions, Equation 11 gives

(12)
$$\frac{du}{dt} = \frac{\Delta P}{\rho U_0} \tau$$

Since $q = \frac{1}{2}\rho U^2 \cong \frac{1}{2}\rho U_0^2$ for reasonably small $u$

(13)
$$\frac{1}{\rho U_0} = \frac{1}{\sqrt{2\rho}\sqrt{q}}$$

where $\rho = P_s/RT$

(14)
$$\frac{1}{\sqrt{2\rho}} = f(h) = f_1(P_s)$$

for a standard for a standard atmosphere therefore,

(15)
$$\frac{du}{dt} \cong \frac{1}{\tau} \times f_1(P_s) \times \frac{1}{\sqrt{q}}\Delta P$$

which follows from Equations 12, 13, and 14.
Also, since $$\frac{1}{g}\frac{du}{dt} = \theta_P \text{ radians}$$

and $q = P_T - P_s$ $\theta_p$ is defined as the angle of the pitch pendulum from vertical.

(16)
$$\frac{1}{g}\frac{du}{dt} \cong \frac{1}{g\tau} \times f_1(P_s) \times \frac{\Delta P}{\sqrt{P_T - P_s}}$$

$\Delta P \cong \theta_p$ radians.

*Pitch correction mechanism*

As shown in the drawing of FIGURE 1A, the impact or total pressure ($P_T$) is applied through a conduit 18 to a pressure sensing mechanism or transducer assembly 20 including a first sensing means comprising a diaphragm 23 and potentiometer pick-off combination. The diaphragm 23 is preferably of a bellows type and is enclosed in a chamber 24. The interior of the bellows diaphragm 23 is connected to the static atmospheric pressure ($P_s$) through a conduit 25 leading from the passage 6 while the chamber 24 which encloses the diaphragm bellows 23 is connected to a source of total pressure through a conduit 18 leading from the passage 2 of the Pitot tube 1 carried by the craft mounting the pressure sensing mechanism 20.

A potentiometer 27 has an adjustable arm 28 which is operated by the sensing means 23. The potentiometer 27 is excited by transformer 29 having a primary winding 26 connected to a suitable source 30 of alternating current which is connected thereto through a conductor 31 and ground connector 31A. A secondary winding 32 of the transformer 29 is connected across the potentiometer 27 and is so arranged as to apply thereto a voltage proportional to $1 \times 1/g$. The voltage output of the potentiometer 27 operated by the sensing means 23 is proportional to the square root of the difference between the total pressure $P_T$ applied through the line 18 and the static pressure $P_s$ applied through the line 25. The arrangement is such that an output signal voltage is applied through a line 33 from the arm 28. This output voltage applied through the arm 28 may be represented mathematically as the square root of $q_c$.

The pressure sensing mechanism 20 is further provided with a second sensing means comprising a diaphragm 34 which may be of a bellows type enclosed in a chamber 36. The interior of the bellows 34 may be evacuated while the chamber 36 which encloses the diaphragm bellows 34 is connected to a source of static pressure through a lead 35 opening to a passage 6 in the Pitot tube 1. A potentiommeter 37 has an adjustable arm 38 which is operatively controlled by the diaphragm bellows 34. The potentiometer 37 is connected at one end to the output lead 33 while the opposite end is connected through a ground connection 39 to the secondary winding 32 of the transformer 29. The output lead 33 of the sensing means 23 is thus connected to the potentiometer 37 of the second sensing means 34 to thereby excite the potentiometer 37. There is an output lead 41 from the adjustable arm 38 of the potentiometer 37. The diaphragm bellows 34 of the second sensing means varies the effect of the potentiometer 37 as a direct function ($f_1$) of the variation in the static pressure ($P_s$).

The combined output voltages of the first and second sensing means 23 and 34 applied through the output lead 41, is therefore, a product of the potentiometer output voltages of sensing means 23 and 34 which may be mathematically represented as $\sqrt{q_c}f_1(P_s)$, in which $q_c = (P_T - P_s)$ and which in turn is an approximation of true airspeed (U) of the craft. The voltage output U of the pressure sensing mechanism 20 is fed through the lead 41 into the input of a high gain buffer type amplifier 43 having a suitable feedback and an output 45 connected across a stator winding 47 of a synchro 48 having a rotor winding 49 adjustably positioned by a diaphragm bellows 51 relative to the stator winding 47.

The diaphragm bellows 51 is enclosed in a chamber 53 and the exterior of the bellows 51 is subject to the total pressure ($P_T$) applied through the conduit 18 leading from the passage 2 of the Pitot tube 1 carried by the craft mounting the pressure sensing mechanism 20 while the interior of the bellows diaphragm 51 is connected through a conduit 55 to a chamber 57 which is in turn connected through a capillary resistance 59 and conduit 61 to the conduit 18. The arrangement is such that the bellows 51 senses the rate of change in the total pressure ($P_T$), said bellows being operatively connected to the rotor winding 49 to adjust said rotor winding 49 relative to the stator winding 47 so as to provide an output signal through line 63 proportional to $$\frac{dU}{dt} \times \frac{1}{g}$$

and which signal is in turn applied to the primary winding 65 of a coupling transformer 67 having a secondary winding 69 connected in the pitch correction circuit for the vertical gyroscope 72, as hereinafter explained.

The schematically shown vertical gyro controlled system of the drawings may include a vertical gyro 72 of conventional type mounted in a case 75 carried by the aircraft and including pitch and bank gimbals 81 and 82 movable angularly about mutually perpendicular axes including pitch axis shaft 83 and bank axis shaft 84.

The vertical gyro 72 includes a pitch inductive device such as pitch axis gyro synchro 86 mounted on the gimbal 82 and positioned coaxially with respect to the pitch axis shaft 83 of the vertical gyro 72. The synchro 86 has a rotor winding 87 mechanically connected to the shaft 83 of the inner pitch gimbal 81 and stator winding 89 mechanically connected to the outer bank gimbal 82. The rotor winding 87 is electrically connected to a suitable source of alternating current 30 through a conductor 90 and a grounded conductor 91.

A pitch torquer 101 may be of a conventional two-phase type having a suitable control winding 102 and a fixed phase winding 103. The control winding 102 is electrically controlled by a signal applied across the output lines 105 from a suitable amplifier 107 having an input line 109 electrically connected through the secondary winding 69 of the transformer 67 to the rotor winding 111 of a pitch pendulum synchro 113 having stator windings 115 mounted on the casing 75 of the vertical gyro. The rotor winding 111 is adjustably positioned relative to the stator windings 115 by a weighted pendulum 117. The stator windings 115 of the pitch pendulum operated synchro 113 are connected in back to back relation with the stator windings 89 of the gyro pitch axis synchro 86 so that there is effected across the winding 111 a pitch pendulum output voltage $$\left(\sin \tan^{-1} \frac{dU}{dt} \times \frac{1}{g}\right)$$

which is a function of the difference in the angular tilt of the pitch gimbal 81 and the angular position of the rotor winding 111 by the pendulum 117.

There is added algebraically to the differential signal or pitch pendulum output voltage thus applied to the rotor winding 111 a signal applied through output line 63 to the coupling transformer 67

$$\left(\frac{dU}{dt} \times \frac{1}{g}\right)$$

proportional to the rate of airspeed divided by the gravitational constant. The total signal or algebraic difference in said voltages is then applied through the amplifier 107 to the torquer motor 101 which is operative to apply a torque to the bank axis shaft 84 and thereby to the bank gimbal 82 so as to precess the pitch gimbal 81 about the vertical gyro pitch axis 83 to drive the rotor winding 87 to a null signal position situation for the input to amplifier 107 to correct for an error in the differential signal so that the pitch pendulum output voltage or signal may be compensated for the effects of longitudinal accelerations of the aircraft in flight on the pitch of the pendulum 117.

*Operation of the pitch correction mechanism*

In the operation of the pitch correction mechanism, a correction signal proportional to the rate of change of true airspeed is added by the coupling transformer 67 to the dynamic vertical signal effected by the pitch pendulum synchro 113. These signals are applied in additive relation in a secondary winding 69 of the transformer 67 and thereby to the input of the amplifier 107.

The aforenoted combined signal is then applied across the output 105 of the amplifier 107 to provide a pitch erection signal effective on the control winding 102 of the pitch torquer 101 to torque the pitch gimbal 81 about the vertical pitch axis 83 so as to return the rotor winding 87 of the pitch axis gyro synchro 86 to a null signal condition.

The generation of the true rate of change of airspeed signal applied by the synchro 48 is obtained by means of a diaphragm bellows airflow measuring device 51 operatively connected to the rotor 49 of the synchro 48 and so operated as to sense the time rate of change of total pressure applied through the line 18. The output of the rate of airspeed sensing synchro 48 is modulated by a function of airspeed and altitude pressures as sensed by the mechanisms 23 and 34, as heretofore explained. An analytical treatment showing the development of the required modulation for conditions in the standard atmosphere is explained under the heading pitch correction computations.

Assuming then that the aircraft is flying in a standard atmosphere, a considerable simplification of the pitch correction system may be effected. It is recognized, of course, that ideally the horizontal component of true airspeed rate of change should be used in this computation, but by approaching a solution of the problem on the basis of conditions in the standard atmosphere, a more complex computation of the ambient air temperature from the total temperature may be obviated in an effort to avoid extreme complexity.

As explained heretofore under the heading "Pitch Correction Computations," it may be seen that quite large deviations in the ambient air temperature from that assumed in the standard atmosphere may exist before appreciable error in the computation is realized. This situation is true because the modulation of the rate of pressure change as a function of dynamic pressure and altitude pressure varies only as the square root of the absolute ambient air temperature (T).

Furthermore, the resistance coefficient of the capillary leak 59 and the elastic properties of the various diaphragms 23, 34, and 51 are so arranged as not to vary appreciably because these components may be readily maintained in a region of the aircraft which is effectively temperature stabilized.

The required modulation of the rate of total change of the pressure signal provided by the synchro 48 is accomplished, as shown in FIGURE 1A, by the two low torque potentiometers 27 and 37 operated directly by the difference between total pressure and static pressure (approximate dynamic pressure $q$) and static pressure ($P_s$) respectively. Furthermore, the buffer amplifier 43 is interposed between the output 41 of the dynamic and static pressure operated potentiometers 27 and 37 and the excitation voltage to the winding 47 of the pressure rate measuring synchro 48 in order to reduce the effect of loading on potentiometer calibrations.

The same voltage source 30 which is used in the excitation of the potentiometer 27 to 37 is also used in the excitation of the rotor winding 87 of the pitch axis gyro synchro 86 which is connected back to back with stator windings 115 of the pendulum operated synchro 113. The synchro 48 applies through the output line 63 a signal proportional to the computed pendulum angle voltage $$\left(\frac{dU}{dt} \times \frac{1}{g}\right)$$

which is in turn applied through the coupling transformer 67 to the secondary winding 69 thereof and therein subtracted from the pitch pendulum output voltage $$\sin \tan^{-1}\left(\frac{dU}{dt} \times \frac{1}{g}\right)$$

before being applied to the pitch erection amplifier 107. In this manner the pitch pendulum signal applied by the synchro 113 is compensated for longitudinal acceleration. The maximum difference between these two quantities for a steady state acceleration of 12 ft./sec./sec. effects an error equivalent to less than 1.4 degrees of gyro angle, and furthermore, it is very probable that such a large acceleration may not exist for very many seconds duration. Consequently, the resulting gyro error from the vertical for maximum erection rates of the order of 1½ degrees per minute will be small.

However, for longitudinal accelerations while the aircraft is in level flight turn, the angle of rotation of the pitch pendulum from the vertical plane may be given by $$\tan^{-1}\left(\frac{dU}{dt} \times \frac{g}{\cos \phi}\right)$$

A correction for this increase in normal acceleration is not provided inasmuch as these longitudinal accelerations are fairly small and do not exist for an appreciable duration of time.

Furthermore, while an inherent lag (approximate time constant of 5 to 10 seconds) may be associated with the pressure rate device 51, such a lag is not considered detrimental when compared with the phugoid period of the aircraft, said period pertaining to the oscillations representing variations in the longitudinal motion of an aircraft which, in the case of an airplane of the commercial jet transport type, for example, may be of the order of 80 seconds.

Pitch monitor

The pitch correction signal applied across the input 109 to the servo amplifier 107 is connected through a conductor 120 and low pass filter 121 to a solenoid winding 122 for actuating a pitch monitor signal 124. When the gyro pitch error signal exceeds a threshold value for a predetermined length of time, the monitor 124 is actuated. The signal to the pitch erection amplifier 107 is normally very small since gyro drift is the only correction which is normally required. Upon a failure of the control system, the error signal rises to a value at which the pitch monitor 124 is rendered effective.

The pitch axis gyro synchro control signals may be operatively connected through conductors 127 to a pitch attitude indicator or automatic pilot control system 129, shown diagrammatically in FIGURE 1B.

Bank correction computations

In discussing the development of the equations to be solved by the bank correction computer, reference is hereinafter made to the following pertinent symbols and equations:

$\phi_p$—Bank angle of pendulum measured from vertical (rad.)
$\phi_a$—Apparent bank angle computed by bank (rad.) correction computer
U—True airspeed (ft./sec.)
$\rho$—Ambient air density, slugs/ft.$^3$
R—Universal gas constant, (53.34 for air)
$P_T$—Total air pressure, lbs./ft.$^2$
$P_S$—Static air pressure, lbs./ft.$^2$
T—Temperature (absolute) of ambient air, Rankine.
q—Dynamic pressure ($\frac{1}{2}$ $\rho U^2$) lbs./ft.$^2$=$P_T$—$P_S$ (approx.)
$q_c$=$P_T$—$P_S$
$\Omega$—Rate of change of flight path angle about the vertical. (rad./sec.)

In a co-ordinated level flight turn the bank pendulum assumes an angle $\phi_p$, where (1) $$\phi_p = \tan^{-1} \frac{U\Omega}{g}$$

measured from the vertical.

Both pitch and bank corrections depend on the computation of true airspeed from air data.

Since $q=\frac{1}{2}\rho U^2 = P_T - P_S$ (approx.)

(2) $$U = \sqrt{\frac{2q_c}{\rho}}$$

where $\rho = P_S/RT$ and, since $$\frac{2}{\sqrt{2\rho}} = f_1(P_S)$$

in a standard atmosphere, Equation 2 can be rewritten (3) $$U = f_1(P_S)\sqrt{q_c}$$

The relationship between $\dot{\psi}$ (measured by a yaw rate gyro) and $\phi_p$ is given by (4) $$\varphi_p = \tan^{-1} \frac{U\dot{\psi} \sec \varphi_a}{g} \text{ (see Equation 1)}$$

Since (5) $$\dot{\psi} = \Omega \cos \varphi_a$$

Bank correction mechanism

As shown in the drawing of FIGURE 1A, the impact of total pressure ($P_T$) applied through conduit 18 to the pressure sensing transducer assembly 20 includes a second conduit 110 leading from the conduit 18 to a second pressure sensing means comprising the diaphragm bellows 115 and potentiometer pick-off combination.

The diaphragm bellows 115 is enclosed in a chamber 117. The interior of the bellows diaphragm 115 is connected to the standard atmosphere pressure ($P_S$) through a conduit 125 leading from the passage 6 of the Pitot tube 1 while the chamber 117 which encloses the diaphragm bellows 115 is connected to the source of total pressure through the conduit 110 leading from the conduit 18 and passage 2 of the Pitot tube 1 carried by the craft mounting the pressure sensing mechanism 20.

In the chamber 117 is a potentiometer 127 having an adjustable arm 128 which is operated by the sensing means 115. The potentiometer 127 is excited by energy voltage from the source 30 of alternating current through a conductor 131 and ground connection 130.

The voltage output of the potentiometer 127 of the sensing means 115 is proportional to the square root of the difference between the total pressure $P_T$ applied through the line 110 and the static pressure $P_S$ applied through the line 125. The arrangement is such that output signal voltage is applied through a line 132 from the arm 128 operatively connected to the bellows diaphragm 115 responsive to $P_T - P_S$. This output voltage applied through the arm 128 may be represented mathematically as the square root of $q_c$.

The pressure sensing mechanism 20 is further provided with another pressure sensing means comprising a diaphragm bellows 134 which may be enclosed in a chamber 133. The interior of the bellows 134 is evacuated while the chamber which closes diaphragm bellows 134 is connected to a source of static pressure through a conduit 135 connect in turn through conduits 125 and 35 to the passage 6 of the Pitot tube 1.

A potentiometer 137 has an adjustable arm 138 which is operatively controlled by the diaphragm bellows 134. The potentiometer 137 is connected at one end to the output lead 132 while the opposite end is connected to the source of alternating current 30 through a ground connection 139. The output lead 132 of the sensing means 115 is thus connected to the potentiometer 137 of the standard static pressure sensing means 134 to thereby excite the potentiometer 137. There is an output lead 141 from the adjustable arm 138 of the potentiometer 137. The diaphragm bellows 134 of the second static pressure sensing means 134 varies the effect of the potentiometer 137 as a direct function ($f_1$) of the variation in the static pressure ($P_S$).

The combined output voltages of the total pressure sensing means 115 and the static pressure sensing means 134 applied through the output lead 141, is therefore, a product of the output voltage of the sensing means 115 and 134 which may be mathematically represented as $\sqrt{q_c f_1 P_s}$ in which $q_c$ equals $P_T - P_S$, and which in turn is an approximation of the true airspeed (U) of the aircraft.

The voltage output U of the pressure sensing mechanism 20 fed through the output line 141 is then fed into the input of a high gain buffer type amplifier 143 having a suitable feedback and an output 145 connected across a stator winding 147 of a synchro 148 having a rotor winding 149. The stator winding 147 is mounted on casing 150 of a yaw or angular rate gyroscope 151 of a type such as shown in U.S. Patent No. 3,009,360, granted November 21, 1961, to Alex Morsewich, and assigned to The Bendix Corporation, assignee of the present invention.

The rotor winding 149 is affixed to the bank axis shaft 152 of the yaw rate gyroscope 151 and adjustably positioned relative to the stator winding 147 upon angular adjustment of yaw rate gyroscope 151 about the flexural pivot 154 thereof.

There is then applied across the rotor winding 149 of the synchro 148 a product signal (U$\dot{\psi}$) proportional to the airspeed of the aircraft multiplied by the yaw rate of the aircraft, which signal is in turn applied to a primary winding 157 of a transformer 158 having a secondary winding 159. The product signal (U$\dot{\psi}$) is in turn induced in the secondary winding 159 and applied to an excitation winding 162 of a linear synchro 163 having a rotor 164 positioned through a shaft 165 by a follower 167 controlled by a secant cam 169. The secant cam 169 is operatively positioned by an output shaft 178 of servomotor 179 to a position which corresponds to the bank angle of the airplane $\phi_a$.

In order to obtain from the product signal (U$\dot{\psi}$) a signal (U$\Omega$) proportional to the true airspeed of the aircraft multiplied by the rate of change of the flight path angle of the aircraft about the vertical, it is necessary to correct the value of the yaw rate signal ($\dot{\psi}$) by the quantity sec.$^{-1}$ $U/g$. This operation is carried out by the secant synchro 163 having a rotor winding 164 adjustably positioned through shaft 165, follower 167, secant cam 169, shaft 178 and servomotor 179 to an angular position corresponding to ($\phi_a$), the bank angle of the aircraft as computed by a bank correction computer, as hereinafter explained.

Such output signal voltage (U$\Omega$) as induced in the rotor winding 164 is applied through conductor line 180 to a stator winding 181 of resolver 183. The stator winding 181 is in turn connected to a ground connection 185. Thus a signal (U$\Omega$) proportional to true airspeed times the rate of change of flight path angle about the vertical is applied to the stator winding 181. A second phase winding 187 is excited by a voltage proportional to ($g$) acceleration due to gravity. A rotor winding 189 is adjustably positioned relative to the first stator phase winding 181 and the second stator phase winding 187. The rotor winding 189 is adjustably positioned by the servomotor 179 so as to cause the windings 181 and 187 to induce in the rotor winding 189 an output voltage proportional to tan$^{-1}$ $U\Omega/g$.

The loop gain of the control system for the ($\phi_a$) servomotor 179 is a function of ($\phi_a$) because tangent and secant functions are involved. The input to the servomotor 179 requires gain compensation in order to obtain a uniform response time. This gain compensation is provided by a variable gain potentiometer 193 having an adjustable arm 195 positioned by the output shaft 178 of the servomotor 179 to so vary the error signal being applied to the input of the servomotor 179 through the amplifier 199 as to obtain a uniform response time. The output of the amplifier 199 is in turn applied to a control winding 201 of the servomotor 179. The fixed phase winding 202 of the servomotor 179 is connected to the source of alternating current 30 through a conductor 204.

As shown in the drawing of FIGURE 1B, the shaft 178 of the servomotor 179 is angularly positioned in accordance with the computed value of the apparent bank vertical angle ($\phi_a$) and the shaft 178 is further operatively connected to the arm 195 of the variable potentiometer 193, the rotor 189 of the resolver 183 and adjustable arm 167 for the rotor 164 of synchro 163. Further, the servomotor 179 is operatively connected through a shaft 206 to a stator case 208 adjustably mounted on the casing 75 of the vertical gyro 722 so as to angularly position stator windings 210 of the pendulum synchro 211 relative to the rotor winding 213 thereof in accordance with the computed value of the apparent bank vertical angle ($\phi_a$). The rotor winding 213 is adjustably positioned by the bank pendulum 215 relative to stator winding 210. The stator windings 210 are connected back to back to the stator windings 217 of the bank axis gyro synchro 219 having a rotor winding 221. The stator windings 217 of the synchro 219 are mounted on the casing 75 of the vertical gyro 72 while the rotor winding 221 is operatively connected through a bank axis shaft 223 to the bank gimbal 82 of the vertical gyro 72.

The rotor winding 221 is in turn operatively connected through a conductor 225 to the output of the alternating current source 30 while the output of the rotor winding 213 of the bank pendulum 211 is connected through a conductor 226 to the input of a servo amplifier 227 which may be of a high gain buffer amplifier type with suitable feedback and output connection 229 leading to a control winding 231 of a bank torquer motor 235. Bank torquer motor 235 is arranged so as to apply a torque to a pitch axis shaft 236 and thereby to the pitch gimbal 81 so as to precess the bank gimbal 82 about bank shafts 84 and 223 to return rotor winding 221 to a null position. The torquer motor 235 has a fixed phase winding 237 connected through a conductor 239 and conductor 31 to an alternating source of current 30. Thus there is applied across the rotor winding 213 a voltage which is the function of the difference in the angular tilt of the bank gimbal 82 and the angular position of the rotor winding 213 by the pendulum 215. There is added to the differential signal thus applied to the rotor winding 213 an additional signal effected by the angular adjustment of the stator case 208 and thereby the stator windings 210 by the servomotor 179 in accordance with the computed value of the apparent bank vertical angle ($\phi_a$). Thus by angularly positioning the case 208 and thereby the stator windings 210 relative to the rotor winding 213 by the aforesaid angle ($\phi_a$), the required correction of the erecting system is automatically accomplished.

Operation of a roll correction mechanism

The vertical gyro 72 is so installed in the aircraft that the bank pendulum 215 of the erecting mechanism will align itself with the apparent vertical in a reasonably coordinated turn in level flight. The angle of the bank pendulum is then very nearly proportional to tan$^{-1}$ $U\Omega/g$ where $\Omega$ is the rate of the change of flight angle (rad./sec.) of the aircraft.

As in the case of the pitch correction computation, the plane is assumed to be flying in a standard atmosphere. An analytic treatment showing the required modulation of the difference betwen total and static pressure is shown in the bank correction computations, as hereinbefore set forth.

FIGURES 1A and 1B show an apparent vertical computer for the bank axis and the addition of such a signal to the bank erection pendulum synchro 211 to effect an adequate correction of the erection system.

The required modulation of the difference between total and static pressure is accomplished, as shown in FIGURE 1A, by two low torque potentiometers 127 and 137 operated directly by the difference between total and static pressures (approximately dynamic pressure, $q$, and static pressure $P_s$, respectively). A buffer amplifier 143 is also used here to reduce the effect of loading on the potentiometer calibrations.

The computation of tan$^{-1}$ $U\Omega/g$ is obtained by means of a servomotor operated resolver 183, one stator phase winding 187 of which is excited by a voltage proportional to $g$ and the other stator phase winding 181 of which is excited a voltage proportional to the quantity of U$\Omega$. This portion of the computer is the only part of the system which requires a servomotor for operation.

The quantity U$\dot{\psi}$ is obtained by exciting the winding 147 of the synchro 148 with a voltage proportional to U and angularly positioning the rotor winding 149 relative thereto by the yaw rate gyroscope 151 in accordance with the signal $\dot{\psi}$. This operation essentially multiplies the voltage proportional to U by $\dot{\psi}$ for a linear calibration of the rate gyro 151. In order to obtain U$\dot{\psi}$, it is necessary to correct the value of yaw rate by the sec.$^{-1}$ $U\Omega g$. This operation is carried out by a secant cam 169 and synchro 163 having the adjustable rotor 164 angularly positioned relative to the winding 162 by the output shaft 178 of the servomotor 179 while the winding 162 is excited by the voltage proportional to U$\dot{\psi}$.

The output shaft 178 of the servomotor 179 is angularly positioned in accordance with the computed apparent vertical angle ($\phi_a$). By rotating the case of pendulum autosyn stator 208 by the computation apparent bank vertical angle ($\phi_a$), the correction for the erecting system is automatically accomplished. The loop gain of the servomotor 179 is a function of the apparent roll vertical angle ($\phi_a$) itself because tangent and secant functions are involved, and will require the gain computations shown in order to obtain a uniform response time. This feature is shown by the variable gain potentiometer 193 on the output shaft 178 to so adjust the error signal before being applied to the servo amplifier 199.

Bank monitor

The bank correction signal applied to the input line 226 to the amplifier 227 is connected through a conductor 250 and low pass filter 253 to a solenoid winding 254 for actuating a pitch monitor signal 256. When the gyro bank error signal exceeds a threshold value for a predetermined length of time, the monitor 256 is actuated. The signal to the bank erection amplifier 227 is normally very small since gyro drift is the only correction which is normally required. Upon a failure of the control system, the error signal rises to a value at which the bank monitor 256 is rendered effective.

The bank axis gyro synchro control signals may be operatively connected through conductors 257 to a bank attitude indicator or automatic control system 259, as shown diagrammatically in FIGURE 1B.

System operation

It will be seen from the foregoing that the invention provides novel means for effecting the desired pitch and bank correction in accordance with the measured rate of change of airspeed of the aircraft inasmuch as the rate of change of airspeed approximates the rate of change of ground speed so that there is provided thereby an approximation of the longitudinal acceleration of the aircraft.

This measure of the rate of change of airspeed of the aircraft effected by measuring the rate of change of the total pressure applied through a calibrated leak device 57, 59, and 61 in turn effects a signal proportional to such measured rate of change by a variable inductive device 48 operated by a differential pressure responsive element 51 in response to the sensed rate of pressure change.

The output signal from the calibrated leak type rate of change of airspeed measuring device is so arranged as to be modulated by factors involving the airspeed and altitude of the aircraft, as shown schematically in the drawings of FIGURES 1A and 1B.

Thus, in the operation of the gyro pitch correction computer, as the aircraft accelerates, the pitch pendulum 117 may swing backward in a counterclockwise direction whereupon the gyro pitch erection mechanism endeavors to follow the pitch pendulum 117.

Furthermore, the signal generated by the rate of change of airspeed devices 53–61 is modulated by the airspeed and altitude pressure responsive devices 23–28 and 34–38 which provides a correction signal at the coupling transformer 67 which subtracts from the error signal effected by the pitch pendulum synchro 113 and the pitch axis gyro synchro 86 so that a signal proportional to the deviation of the gyro from the vertical is effected. Thus, at such times as the pitch of the gyro deviates from the vertical, this pitch signal will be corrected and applied through an amplifier 107 to the pitch torquer 101 to effect the desired correction independently of the longitudinal accelerations of the aircraft.

Furthermore, it will be seen from the foregoing that the vertical gyro 72 is also corrected for deviations about the bank axis thereof through the operation of the bank axis synchro 219 in conjunction with the bank pendulum synchro 211. The error signal resulting from the joint operation of the synchro 219 and 211 is also corrected for forces acting on the pendulum 215 due to the airspeed and rate of turn of the aircraft.

In the latter arrangement, the excitation of the rate gyro synchro 148 is effected by a signal which is proportional to the airspeed of the aircraft, and through the operation of the synchro 148, there is effected an output signal which is proportional to the airspeed of the aircraft times the yaw rate of the aircraft. The yaw rate gyro 151 measures the rate of turn of the aircraft. However, when the aircraft is banked, the error signal has to be corrected for the turn in bank effect produced.

In effecting the latter operation, the servomotor 179 is provided having an output which is proportional to the computed value of the apparent bank vertical angle ($\phi_a$). In the control of the servomotor 179, there is provided a resolver having a rotor winding 189 positioned by the servomotor relative to the stator winding 181 excited by a voltage proportional to airspeed of the aircraft times the rate of turn of the aircraft as well as relative to the stator winding 187 excited by a voltage proportional to the gravitational constant ($g$).

The arrangement is such that the rotor winding 189 which provides output voltage to the servomotor 179 is driven by the servomotor 179 to a position at which the output voltage introduced in the rotor 189 by the respective windings 181 and 187 is at a null value, in which case, the output shaft of the servomotor 179 will be adjusted to an angular position corresponding to the desired correction for the centrifugal and accelerational forces acting on the blank pendulum 215.

This correction is applied to an output shaft 206 from the servomotor 179 so as to adjustably position the synchro casing 208 and thereby the synchro windings 210 relative to the rotor winding 213. In other words, upon the pendulum 215 of the bank synchro 211 being actuated in response to the centrifugal force applied in the turn of the aircraft, the computing mechanism described will compute a bank angle applied by the servomotor 179 acting to cause the case 208 of the bank pendulum synchro 211 to be adjusted so as to correct for the errors introduced forces acting on the bank pendulum 215.

Although only one embodiment of the invention has been illustrated and described, various changes in the form and relative arrangement of the parts, which will now appear to those skilled in the art may be made without departing from the scope of the invention. Reference is, therefore, to be had to the appended claims for a definition of the limits of the invention.

What is claimed is:

1. In an aircraft having a vertical gyroscope generating a pitch signal, a control system for the vertical gyroscope including means for producing erection of the gyroscope about a pitch axis during flight of the aircraft, said control system comprising first means for generating a signal proportional to rate of change in airspeed of the aircraft, second means for sensing a dynamic vertical error in the pitch signal of the gyroscope, and third means for adding the rate of change signal and the vertical error signal to obtain a resultant control signal, and a torque motor controlled by said resultant signal for erecting the gyroscope about the pitch axis.

2. In an aircraft having a vertical gyroscope generating a bank signal, a control system for the vertical gyroscope including means for producing erection of the gyroscope about a bank axis during flight of the aircraft, said control system comprising first means for generating a signal proportional to airspeed of the aircraft, second means for generating a signal proportional to rate of change of the flight path angle of the aircraft about the vertical of the aircraft, third means responsive to said signals to generate a resultant signal proportional to airspeed multiplied by the rate of change of the flight path angle of the aircraft about the vertical, and a torquer motor controlled by said resultant signal for erecting the gyroscope about the bank axis.

3. In an aircraft having a vertical gyroscope, a control system for the vertical gyroscope including means for producing erection of the gyroscope about pitch and bank axes of the gyroscope during flight of the aircraft, said control system comprising means for generating a signal proportional to the rate of change in airspeed of the aircraft, means for sensing a dynamic vertical error in a pitch signal of the gyroscope, means for adding the rate of change of airspeed signal and the vertical error signal to obtain a resultant control signal, a torquer motor controlled by said resultant control signal for erecting the gyroscope about the pitch axis, means for effecting a signal proportional to the airspeed of the aircraft, means for generating a signal proportional to the rate of change of the flight path angle of the aircraft about the vertical of the aircraft, computer means responsive to said rate and airspeed signals to generate a resultant signal proportional to the value of the airspeed signal multiplied by the value of the rate of change of the flight path angle of the aircraft about the vertical, a second torquer motor for erecting the gyroscope about the bank axis, means for sensing a dynamic vertical error in a bank signal of the gyroscope for controlling said second torquer motor, and means operatively connecting said computer means to said last-mentioned error sensing means so as to vary the control of said second torquer motor in accordance with said resultant signal.

4. In an aircraft, the combination comprising a vertical gyroscope, means for deriving an electrical signal proportional to airspeed of the aircraft, gyroscopic stabilizing means operatively connected to said first mentioned means and referenced with respect to an effective yaw rate of the aircraft and to said airspeed signal to provide a bank error correction signal proportional to displacement of the spin axis of the vertical gyroscope from true vertical in a plane of banking motion of the aircraft, and means responsive to the bank error correction signal for precessing the gyroscope to a true vertical position.

5. In an aircraft, the combination comprising a vertical gyroscope, a yaw rate gyroscope, means operated by the yaw rate gyroscope to generate a control signal, a pendulous bank sensing device to generate a bank error signal, means responsive to the control signal for adjusting the pendulous bank sensing device to vary the bank error signal in accordance with the yaw rate to provide a resultant signal, and means responsive to the resultant signal for precessing the vertical gyroscope in bank so as to maintain the vertical gyroscope in a true vertical position.

6. The combination defined by claim 5 including means for sensing the airspeed of the aircraft for varying the yaw rate signal in accordance therewith.

7. In an aircraft having a vertical gyroscope generating a pitch signal, a control system for the vertical gyroscope comprising means for generating a signal proportional to rate of change in airspeed of the aircraft, means responsive to the airspeed of aircraft to modulate the rate of change signal, means for sensing a dynamic vertical error in the pitch signal of the gyroscope, means for adding the modulated rate of change signal and the vertical error signal to obtain a resultant control signal, and a torquer motor controlled by said resultant signal for erecting the gyroscope about the pitch axis.

8. In an aircraft having a vertical gyroscope generating a pitch signal, a control system for the vertical gyroscope comprising first means for generating a signal proportional to rate of change in airspeed of the aircraft, second means responsive to the airspeed of aircraft, third means responsive to atmospheric pressure at the prevailing altitude of the aircraft, said second and third means being arranged to modulate the rate of change signal, fourth means for sensing a dynamic vertical error in the pitch signal of the gyroscope, fifth means for adding the modulated rate of change signal and the vertical error signal to obtain a resultant control signal, and a torquer motor controlled by said resultant signal for erecting the gyroscope about the pitch axis.

9. In an aircraft having a vertical gyroscope generating a bank signal, a control system for the vertical gyroscope comprising means for generating a signal proportional to airspeed of the aircraft, a yaw rate gyroscope for generating a signal proportional to yaw rate of the aircraft, a synchro including a stator winding energized by said airspeed signal, and a rotor winding inductively coupled to said stator winding and adjustably positioned relative thereto by said yaw rate gyroscope in accordance with said rate signal to induce a resultant signal in the rotor winding proportional to the airspeed of the aircraft multiplied by the value of the rate signal of the yaw rate gyroscope, a second synchro including a stator winding energized by said resultant signal and a rotor winding inductively coupled to the stator winding and adjustably positioned relative thereto, motor means to adjustably position the rotor winding, means electrically connecting the rotor winding in controlling relation to the motor means, means for drivingly conecting the motor means to the rotor winding, said driving means including a secant cam means operative by said motor means so as to adjustably position the rotor winding in relation to the stator winding of the last-mentioned synchro to cause the stator winding to induce in the rotor winding a signal proportional to the value of the airspeed of the aircraft multiplied by the value of the rate of change of the flight path angle of the aircraft about the vertical of the aircraft, and torquing means including control means adjustably by said motor means for causing the torquing means to erect the gyroscope about the bank axis in response to said resultant signal.

10. In an aircraft having a vertical gyroscope, a control system for the vertical gyroscope including means for producing the erection of the gyroscope about the pitch and bank axes of the gyroscope during flight of the aircraft, said control system comprising means for generating a signal proportional to the rate of change in airspeed of the aircraft, means responsive to the airspeed of the aircraft and the atmospheric pressure at the prevailing altitude of the aircraft to modulate the rate of change signal, means for sensing a dynamic vertical error in the pitch signal of the gyroscope, means for adding the modulated rate of change signal and the vertical error signal to obtain a first resultant control signal, a first torquer motor controlled by said first resultant signal for erecting the gyroscope about the pitch axis, means for generating a signal proportional to the airspeed of the aircraft, a yaw rate gyroscope for generating a signal proportional to the yaw rate of the aircraft, a first synchro including a stator winding energized by said airspeed signal, and a rotor winding inductively coupled to said stator winding and adjustably positioned relative thereto by said yaw rate gyroscope to generate a second resultant signal in the rotor winding proportional to the airspeed of the aircraft multiplied by the value of the rate signal of the yaw rate gyroscope, a second synchro including a stator winding energized by said second resultant signal and a rotor winding inductively coupled to the stator winding of the second synchro and adjustably positioned relative thereto, a servomotor to adjustably position the rotor winding, means electrically connecting the rotor winding in controlling relation to the servomotor, means for drivingly connecting the servomotor to the rotor winding, said driving means including a secant cam means operatively connecting said servomotor and said rotor winding so as to adjustably position the rotor winding of the second synchro in relation to the stator winding thereof so as to induce in the rotor winding a signal proportional to the airspeed of the aircraft multiplied by the rate of change of the flight path angle of the aircraft about the vertical of the aircraft, and torquing means including means controlled by said servomotor for erecting the gyroscope about the bank axis in response to said second resultant signal.

11. In an aircraft having a vertical gyroscope generating a bank signal, a control system for the gyroscope comprising means for generating an electrical signal proportional to airspeed of the aircraft, gyroscopic stabilizing means including a rate gyroscope responsive to yaw rate of the aircraft, a signal device energized by said airspeed signal and operative by the yaw rate gyroscope to provide a resultant signal proportional to the value of the airspeed signal multiplied by the yaw rate signal, and computing means energized by said resultant signal to provide a bank error correction signal proportional to displacement of the gyroscopic spin axis from true vertical in a plane of banking motion in an aircraft, and means responsive to the bank error correction signal for precessing the vertical gyroscope to a true vertical position.

12. In an aircraft, a vertical gyroscope comprising a gimbal, first means to pivotally mount the gimbal about a bank axis of the aircraft, a synchro for providing a bank axis signal and including a stator member and a rotor element, second means to mount the synchro on an axis parallel to the bank axis of the aircraft, said rotor element being operatively connected to said gimbal and adjustably positioned relative to said stator member by the gimbal in response to angular movement thereof about the bank axis, a pendulous signal device, said second means mounting said device on an axis extending parallel to the bank axis of the aircraft, said device including a synchro having a stator member, a rotor element, and a pendulum, said rotor element being angularly positioned relative to said stator member by said pendulum, the pendulum being operatively connected to the rotor element, third means for computing a bank vertical of the aircraft including fourth means responsive to the airspeed of the aircraft, fifth means responsive to the yaw rate angle of the aircraft, and said third bank vertical angle computer means including motor means controlled by said fourth and fifth means for angularly positioning the stator member of the bang pendulum synchro in accordance with the computed bank vertical of the aircraft.

13. In an aircraft, a vertical gyroscope comprising a gimbal, first means to pivotally mount the gimbal about the pitch axis of the aircraft, an electrical signal device having an output and including a stator element and a rotor element, said first means mounting the signal device on an axis parallel to the pitch axis of the aircraft, the rotor element being operatively connected to the gimbal and adjustably positioned relative to the stator element by angular adjustment of the gimbal about the pitch axis, a pendolous signal device having an output, second means to mount said pendulous signal device on an axis extending parallel to the pitch axis of the aircraft, said pendulous signal device including a stator element, a rotor element and a pendulum, said rotor element angularly positioned relative to the stator element by the pendulum, said pendulum being operatively connected to said rotor element, said stator element of the pendulous signal device being electrically connected to the stator element of the pitch signal device, third means to measure a rate of change of air speed, and fourth means responsive to the measured rate of change of airspeed of the aircraft for applying a corrective signal to an output of the signal devices.

14. The combination defined by claim 13 including means for generating a signal corresponding to the true airspeed of the aircraft, and means responsive to said signal to modulate the signal of the rate of change measuring device.

15. The combination defined by claim 13 including means for generating a signal corresponding to the airspeed of the aircraft, fifth means responsive to said airspeed signal, means for sensing the atmospheric pressure at the prevailing altitude of the aircraft, sixth means responsive to said pressure sensing means, and said fifth and sixth means being arranged to generate a signal for modulating the corrective signal from the fourth rate of change airspeed measuring means.

References Cited by the Examiner

UNITED STATES PATENTS

| | | | |
|---|---|---|---|
| 2,597,151 | 5/1952 | Konet | 33—204 |
| 2,620,669 | 12/1952 | Braddon | 74—5.4 |
| 2,630,017 | 3/1953 | Slater | 74—5.47 |
| 2,734,278 | 2/1956 | Hammond | 33—204 |
| 2,786,357 | 3/1957 | Quermann | 74—5.7 |

FRED C. MATTERN, Jr., *Primary Examiner.*

BENJAMIN A. BORCHELT, SAMUEL FEINBERG, BOROUGHTON G. DURHAM, *Examiners.*

R. F. STAHL, P. W. SULLIVAN, *Assistant Examiners.*